(12) United States Patent
Lin et al.

(10) Patent No.: US 6,546,135 B1
(45) Date of Patent: Apr. 8, 2003

(54) METHOD FOR REPRESENTING AND COMPARING MULTIMEDIA CONTENT

(75) Inventors: I-Jong Lin, Lawrenceville, NJ (US); Anthony Vetro, Staten Island, NY (US); Ajay Divakaran, Scotch Plains, NJ (US); Sun-Yuan Kung, Princeton, NJ (US)

(73) Assignee: Mitsubishi Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/385,169

(22) Filed: Aug. 30, 1999

(51) Int. Cl.[7] .................................................. G06K 9/46
(52) U.S. Cl. ..................... 382/190; 707/104.1; 382/232
(58) Field of Search ................................. 382/190, 173, 382/240, 206, 232; 707/104.1

(56) References Cited

U.S. PATENT DOCUMENTS

| | | | | |
|---|---|---|---|---|
| 5,412,774 A | * | 5/1995 | Agrawal et al. | 345/804 |
| 5,487,117 A | * | 1/1996 | Burges et al. | 382/173 |
| 6,266,053 B1 | * | 7/2001 | French et al. | 345/440 |

OTHER PUBLICATIONS

Fredericksen et al. "Interactive Object Definition in Medical Images Using Multiscale, Geometric Image Descriptions." Proc. Firs Conf. on Visualization in Biomedical Computing, May 1990, pp. 108–114.*

Speegle "Views of Media Objects in Multimedia Databases." Proc. Int. Workshop on Multi–Media Database Management Systems, Aug. 1995, pp.20–27.*

Miller et al. "News On–Demand for Multimedia Networks." Proc. First ACM Int. Conf. on Multimedia, 1993, pp. 383–392.*

Lin et al. Coding and Comparison of DAG's as a Novel Neural Structure with Applications to On–Line Handwriting Recognition IEEE Trans. on Signal Processing, vol. 45, No. 11, Nov. 1997, pp. 2701–2708.*

Lee et al. "Querying Multimedia Presentations Based on Content." IEEE Trans. On Knowledge and Data Engineering, vol. 11, No. 3, May 1999, pp. 361–385.*

I–Jong Lin et al.; "Coding and Comparison of DAGs as a Novel Neural Structure with Applications to On–Line Handwriting Recognition"; www.ee.princeton.edu/>ijonglin/; Mar. 18, 1997.

* cited by examiner

Primary Examiner—Jon Chang
(74) Attorney, Agent, or Firm—Dirk Brinkman

(57) ABSTRACT

A method for generating a representation of multimedia content by first segmenting the multimedia content spatially and temporally to extract objects. Feature extraction is applied to the objects to produce semantic and syntactic attributes, relations, and a containment set of content entities. The content entities are coded to produce directed acyclic graphs of the content entities, where each directed acyclic graph represents a particular interpretation of the multimedia content.

18 Claims, 7 Drawing Sheets

METHOD FOR REPRESENTING AND COMPARING MULTIMEDIA CONTENT

FIELD OF THE INVENTION

This invention relates generally to processing multimedia content, and more particularly, to representing and comparing multimedia content.

BACKGROUND OF THE INVENTION

There exist many standards for encoding and decoding multimedia content. The content can include audio signals in one dimension, images with two dimensions in space, video sequences with a third dimension in time, text, or combinations thereof. Numerous standards exist for audio and text.

For images, the best known standard is JPEG, and for video sequences, the most widely used standards include MPEG-1, MPEG-2 and H.263. These standards are relatively low-level specifications that primarily deal with the spatial compression in the case of images, and spatial and temporal compression for video sequences. As a common feature, these standards perform compression on a frame basis. With these standards, one can achieve high compression ratios for a wide range of applications.

Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). This emerging standard is intended to enable multimedia applications, such as interactive video, where natural and synthetic materials are integrated, and where access is universal. For example, one might want to "cut-and-paste" a moving figure or object from one video to another. In this type of scenario, it is assumed that the objects in the multimedia content have been identified through some type of segmentation algorithm, see for example, U.S. patent application Ser. No. 09/326,750 "Method for Ordering Image Spaces to Search for Object Surfaces" filed on Jun. 4, 1999 by Lin et al.

The most recent standardization effort taken on by the MPEG committee is that of MPEG-7, formally called "Multimedia Content Description Interface," see "MPEG-7 Context, Objectives and Technical Roadmap," ISO/IEC N2729, March 1999. Essentially, this standard plans to incorporate a set of descriptors and description schemes that can be used to describe various types of multimedia content. The descriptor and description schemes are associated with the content itself and allow for fast and efficient searching of material that is of interest to a particular user. It is important to note that this standard is not meant to replace previous coding standards, rather, it builds on other standard representations, especially MPEG-4, because the multimedia content can be decomposed into different objects and each object can be assigned a unique set of descriptors. Also, the standard is independent of the format in which the content is stored. MPEG-7 descriptors can be attached to compressed or uncompressed data.

Descriptors for multimedia content can be used in a number of ways, see for example "MPEG-7 Applications," ISO/IEC N2728, March 1999. Most interesting, for the purpose of the description below, are database search and retrieval applications. In a simple application environment, a user may specify some attributes of a particular object. At this low-level of representation, these attributes may include descriptors that describe the texture, motion and shape of the particular object. A method of representing and comparing shapes has been described in U.S. patent application Ser. No. 09/326,759 "Method for Ordering Image Spaces to Represent Object Shapes" filed on Jun. 4, 1999 by Lin et al. One of the drawbacks of this type of descriptor is that it is not straightforward to effectively combine this feature of the object with other low-level features. Another problem with such low-level descriptors, in general, is that a high-level interpretation of the object or multimedia content is difficult to obtain. Hence, there is a limitation in the level of representation.

To overcome the drawbacks mentioned above and obtain a higher-level of representation, one may consider more elaborate description schemes that combine several low-level descriptors. In fact, these description schemes may even contain other description schemes, see "MPEG-7 Description Schemes (V0.5)," ISO/IEC N2844, July 1999.

As shown in FIG. 1a, a generic description scheme (DS) has been proposed to represent multimedia content. This generic audio-visual DS 100 includes a separate syntactic DS 101, and a separate semantic DS 102. The semantic structure refers to the physical and logical signal aspects of the content, while the semantic structure refers to the conceptual meaning of the content. For a video sequence, the syntactic elements may be related to the color, shape and motion of a particular object. On the other hand, the semantic elements may refer to information that cannot be extracted from low-level descriptors, such as the time and place of an event or the name of a person in the multimedia content. In addition to the separate syntactic and semantic DSs, a syntactic-semantic relation graph DS 103 has been proposed to link the syntactic and semantic DSs.

The major problem with such a scheme is that the relations and attributes specified by the syntactic and semantic DS are independent, and it is the burden of the relation graph DS to create a coherent and meaningful interpretation of the multimedia content. Furthermore, the DSs mentioned above are either tree-based or graph-based. Tree-based representations provide an efficient means of searching and comparing, but are limited in their expressive ability; the independent syntactic and semantic DSs are tree-based. In contrast, graph-based representations provide a great deal of expressive ability, but are notoriously complex and prone to error for search and comparison.

For the task at hand, it is crucial that a representation scheme is not limited to how multimedia content is interpreted. The scheme should also provide an efficient means of comparison. From a human perspective, it is possible to interpret multimedia content in many ways; therefore, it is essential that any representation scheme allows multiple interpretations of the multimedia content. Although the independent syntactic and semantic DS, in conjunction with the relation graph DS, may allow multiple interpretations of multimedia content, it would not be efficient to perform comparisons.

As stated above, it is possible for a DS to contain other DSs. In the same way that the generic DS includes a syntactic DS, a semantic DS, and a syntactic/semantic relation graph DS. It has been proposed that the syntactic DS 101 includes a segment DS 105, a region DS 106, and a segment/region relation graph DS 107. As shown in FIG. 1b, the segment and region DSs may be used to define the temporal and spatial tree structure of multimedia content, respectively, and the segment/region relation graph DS may be used to describe the spatio-temporal relationships between segments and regions. Similarly, as shown in FIG. 1c, the semantic DS 102 includes an event DS 108, an object DS 109, and an event/object relation graph DS 110. The event and object DSs may be used to define event and object trees that define semantic index tables for temporal events and spatial objects, respectively. The event/object relation graph DS may be used to describe any type of spatio-temporal relationship between events and objects. As with the higher level DSs, namely the semantic and syntactic DSs, these lower-level DSs suffer the same problems with expressiveness and computational complexity.

Therefore, there is a need for representing syntactic and semantic attributes of multimedia content that balances the complexities of data structures and the methods that operate on the structures.

SUMMARY OF THE INVENTION

The present invention provides a new method of representing syntactic and semantic attributes of multimedia content. It is an object of the invention to use existing attributes that may be contained within a semantic or syntactic description scheme using a framework that balances the restrictions on structure and expressiveness of elements, with the computational complexity of operations on those elements.

The method according to the invention is based in part on directed acyclic graphs (DAG). It is well known that the DAG occupies a middle ground between tree-based and graph-based representations. In addition, the DAG provides a new functionality of composition. In other words, many structural compositions of an entity can be described by many structural compositions of its contained elements.

Most importantly though, the similarity between these structural compositions and the structural compositions created by another entity can be easily computed. Within this composition framework, the DAG also provides a means of combining syntactic and semantic elements so that similarity comparisons may seamlessly switch between both types of descriptions. In some sense, this can be viewed as a unification between the syntactic and semantic parts of the description scheme.

The method for representing the semantic and syntactic elements in a unified way also provides a means for unifying the spatial and temporal elements of multimedia content. The invention relies on the fact that the compositions referred to earlier are spatio-temporal compositions that contain both syntactic and semantic elements. The important points to keep in mind is that the compositions according to the invention are DAG representations, which facilitate multiple interpretations and low complexity comparison, and that the compositions, which define spatio-temporal attributes, both syntactic and semantic, are contained within the respective content entities.

More particularly, the method generates a representation of multimedia content by first segmenting the multimedia content spatially and temporally to extract objects. Feature extraction is applied to the objects to produce semantic and syntactic attributes, relations, and a containment set of content entities. The content entities are coded to produce directed acyclic graphs of the content entities. Nodes of the directed acyclic graphs represent the content entities, and edges represent breaks in the segmentation. Each directed acyclic graph represents a particular interpretation of the multimedia content.

In one aspect the multimedia content is a two dimensional image, and in another aspect the multimedia content is a three dimensional video sequence.

In a further aspect of the invention, representations for different multimedia contents are compared based on similarity scores obtained for the directed acyclic graphs.

DETAILED DESCRIPTION OF PREFERRED EMBODIMENTS

Introduction

We describe methods for representing and comparing multimedia content. The methods are based a new generic data structure, which includes a directed acyclic graph (DAG) representation. In the following, we describe objects in our scheme and the advantages of the DAG representation. It is the DAG representation that allows the scheme to infer multiple interpretations of multimedia content, yet still be efficient in the comparison with other multimedia content. In fact, when we score with respect to a probability likelihood function, the computations are not only tractable, but also optimal.

Besides describing the generic data structure, we also describe two important functions that allow us to realize this efficient representation and perform comparisons. The first function will be referred to as a DAG-Coder. The DAG-Coder is responsible for taking individual content entities contained in the object and producing a DAG-Composition. The second function is an Object-Compare. The Object-Compare efficiently compares two content entities by determining a similarity score.

After the data structure and two functions mentioned above have been described, we review and elaborate on applications that are enabled by our representation scheme. Finally, an integrated application system that performs feature extraction, database management and object comparison is described.

Generic Description Scheme of a Content Entity

To introduce our scheme of representing content objects, we define generic object types, and restrictions on instantiations of such generic object types.

Figure 1A:
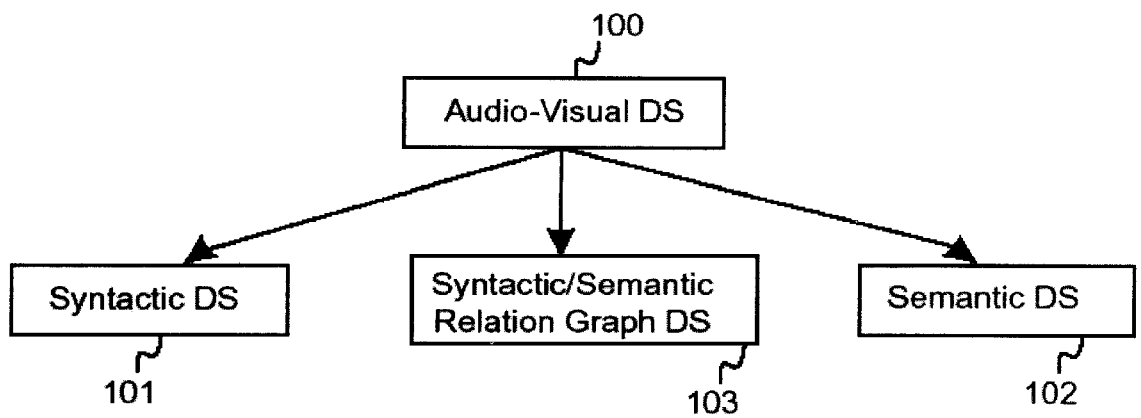
FIGS. 1*a*–1*c* are block diagrams of prior art description schemes.
Figure 1B:
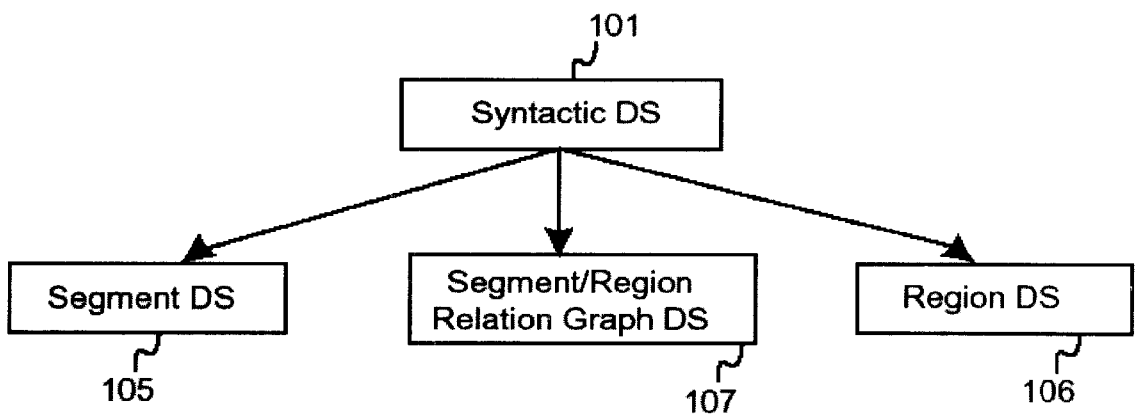
Figure 1C:
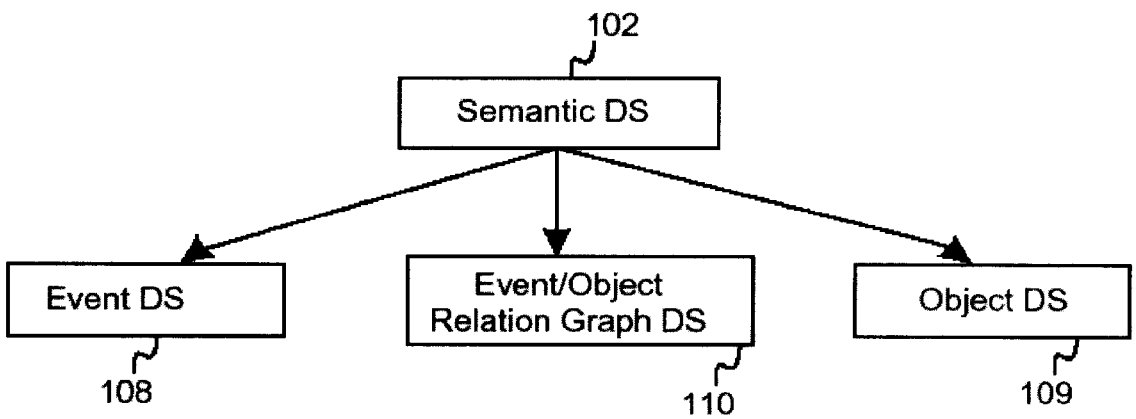
Figure 2:
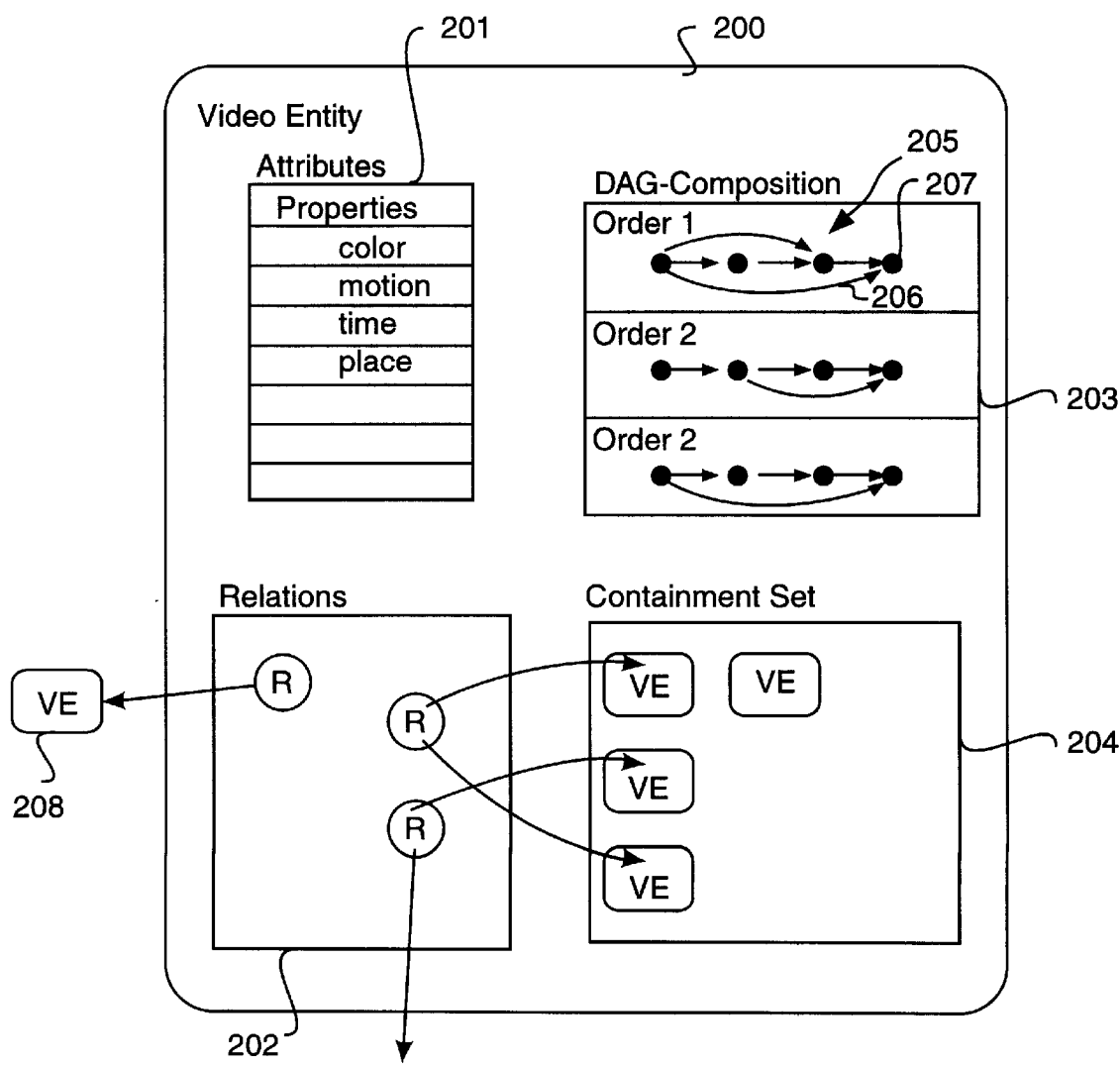
FIG. 2 is a block diagram of a description scheme for a general content entity according to the invention.

As shown in FIG. 2, a content entity, for example, a video entity 200 is the main part of our scheme. The content entity is a data object that relates contained objects together. The content entity is a recursive data structure divided into four parts: attributes (properties) 201, relations 202, DAG-Compositions 203, and a containment set 204.

Attributes

The attributes 201 form the basis within our recursive description scheme. Attributes are an unordered set that contains properties that may provide details about parts of the entity or summarize the entity as a whole. Attributes are global to the object and may refer to such syntactic properties as color and motion, or other semantic properties of the object such as time and place. The attributes provide basic, low-level information without any structure, however, after structure is added, it is these properties that actually contribute to the degree of similarity. Also; as we will describe later, attributes can define an ordering that help to compose and interpret the individual entities contained within the object. It should be noted that these properties are inherent qualities of the content entity that contains them and instantiations of this entity should be accessible/visible through the content entity itself.

As an example, a video sequence of a airplane landing on a runway may contain the semantic attributes of place, date, time and temperature, along with the caption, "airplane (767) landing." Some syntactic attributes that may be attached to this multimedia content are the trajectory of descent. Attached to the airplane object may be the color and shape of the airplane itself. Here, we make an important distinction between attributes of the multimedia content and attributes of the objects. The reason that the trajectory is an attribute of the multimedia content is because trajectory is relative to the ground. Therefore, it does not make sense as an attribute of the plane alone, whereas color and shape do make sense.

Relations

The relations (R) 202 are objects that detail relationships between content entities (VE). It is important to note that the context of the relations is given by the containing content entity. The reason is that multimedia content that are segmented differently will produce different relations. Essentially, the relation can be viewed as a hyperlink between a contained object and something else, for example, another content entity. Types of relations are global and instantiations of relations should only be accessible within the content entity itself. One of the utilities of relations is that they may be useful in guiding a search. Returning to our example of the airplane landing, several relations can be identified: the plane is landing on the runway, the lights are guiding the plane, and the runway is located at a particular airport with a particular orientation.

The relations are different from containment, described below, in that the related object may not be completely contained by the content entity and therefore is not considered in similarity comparisons. However, relations allow a user to search for other relevant objects to the content entity in question. All the relations in the content entity must have one argument that is contained within the content entity.

DAG-Compositions

In general, the DAG-Compositions 203 are directed acyclic graphs 205 where edges 206 represent content entities and nodes 207 correspond to breakpoints in the segmentation. The DAG-Composition allow us to infer multiple interpretations of the same multimedia content. Because DAGs operate on 1D spaces, segmentation in this context refers to the delineation of some 1D process. For instance, if we consider a spatio-temporal multimedia content, then the temporal segmentation is a 1D process that defines points in time where several successive events may begin and end. Hence, we may have a DAG-Composition that corresponds to temporal actions. In the spatial domain, we may define an order from left to right across an image. In this way, we may have a DAG-Composition that corresponds to object positions from left to right. Of course, we may define other orderings such as a counter-clockwise spatial ordering, which may serve a totally different purpose.

In U.S. patent applications Ser. Nos. 09/326,750 and 09/326,759, incorporated herein by reference, Voronoi ordering functions were respectively defined over the exterior and interior image space with respect to an object boundary. The ordering on the interior space was particularly useful in obtaining a skeleton-like representation of the object shape, then forming a partially ordered tree (POT), which made use of the DAG representation.

It should be emphasized though that the method of ordering 2D images or 3D video sequences to achieve DAG-Compositions is not the focus here, rather we are concerned with techniques that use the DAG-Composition to infer higher-level interpretations of a particular multimedia content.

Containment Set

The containment set 204 includes pointers to other content entities that are strictly contained temporally and/or spatially within the content entity 200. The restriction on the containment set is that one object cannot contain another object that contains the first object, i.e., containment induces a directed acyclic graph. The content entities need not be mutually exclusive and there is no ordering within the containment set. For example, in the video sequence of the airplane landing, the containment set includes pointers to each content entity. Some possibilities include pointers to the plane, the runway, the runway lights, the plane touching down, radio communications, etc.

DAG-Coder

The DAG-Compositions are the result of different DAG-Coders applied to the content entity. In other words, given the content entities in the containment set and their relations, different DAG-Coders produce different interpretations of the multimedia content. This function is further described in the following.

A DAG-Coder is a function that segments a given content entity into its components by inducing an ordering over the content entity components. The DAG-Coder produces the DAG-Composition 204. The DAG-Coder is global to the database and can be applied to any content entity. The DAG-Coder provides a perspective on the spatio-temporal content space and make similarity calculations between objects more tractable. A path in the DAG represents an interpretation of the content entity 200. This DAG representation becomes a framework for the description scheme that can interchange syntactic and semantic information, at any level. Furthermore, the complexity of the description scheme is hidden from the user.

Multiple Path Through a DAG

The DAG-Coder produces multiple interpretations of the multimedia content through such DAG-Compositions. This is achieved through the multiple path structure of the DAG. In the following, we focus on what these multiple paths really mean in terms of the multimedia content.

Figure 3A:
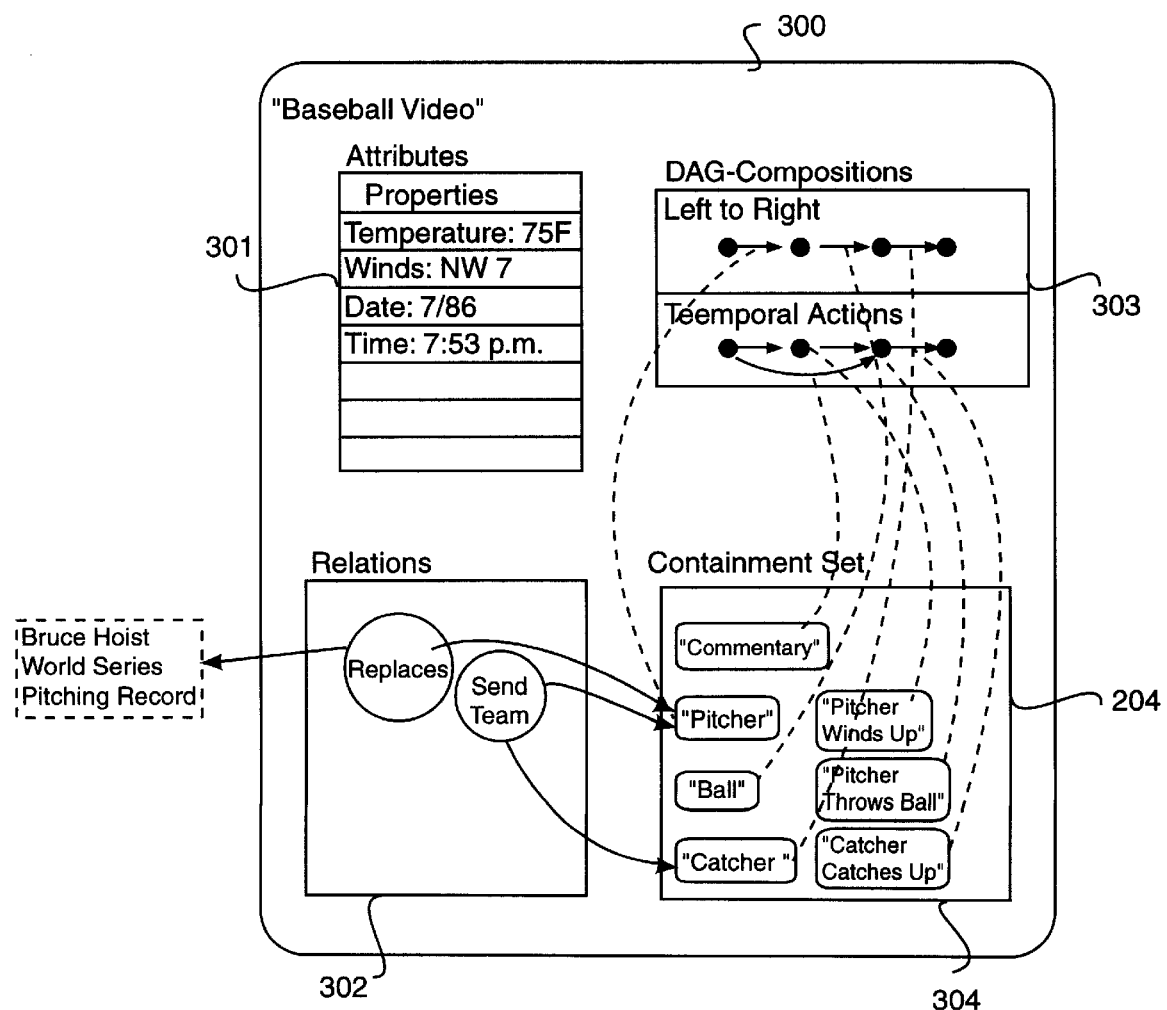
FIGS. 3*a*–3*c* are a block diagrams of description schemes for example content entities.
Figure 3B:
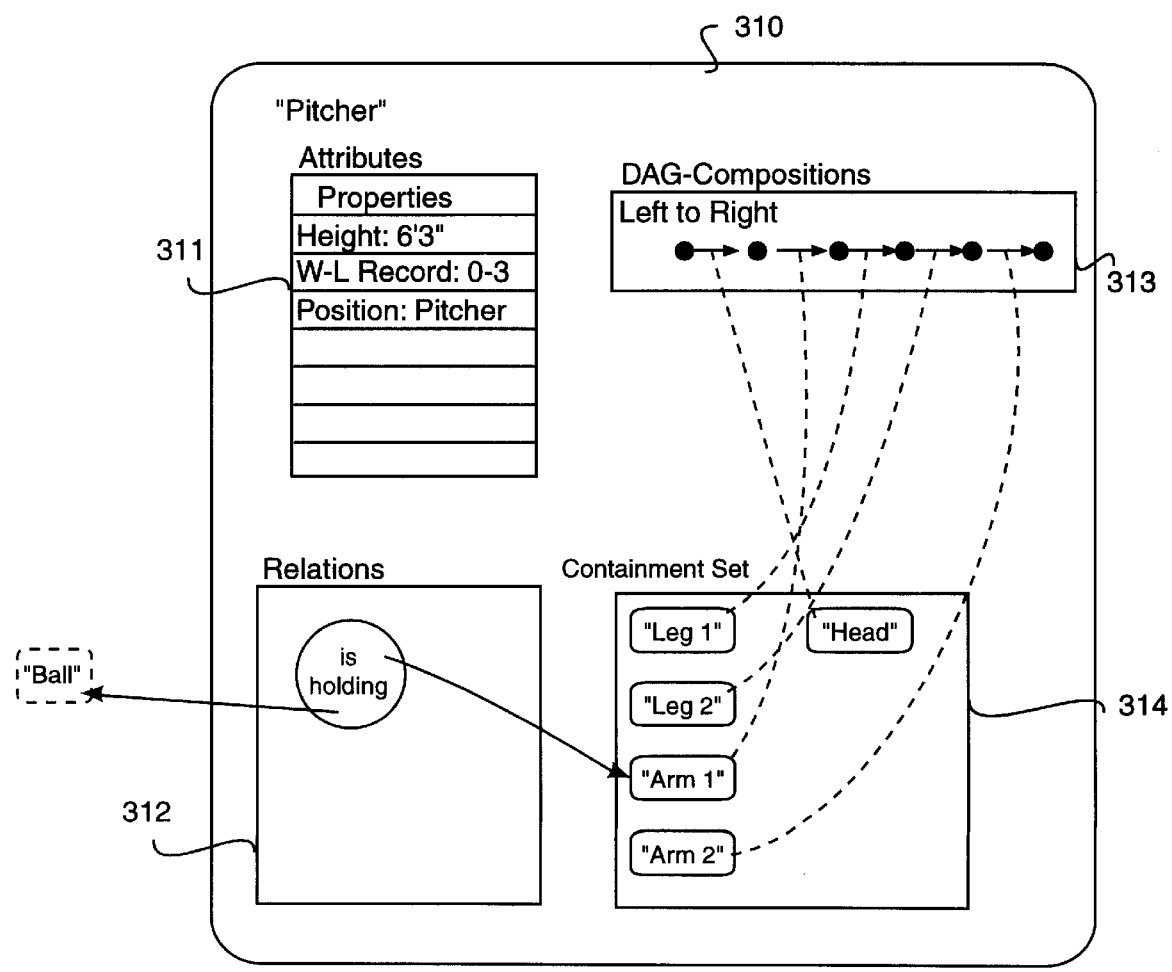
Figure 3C:
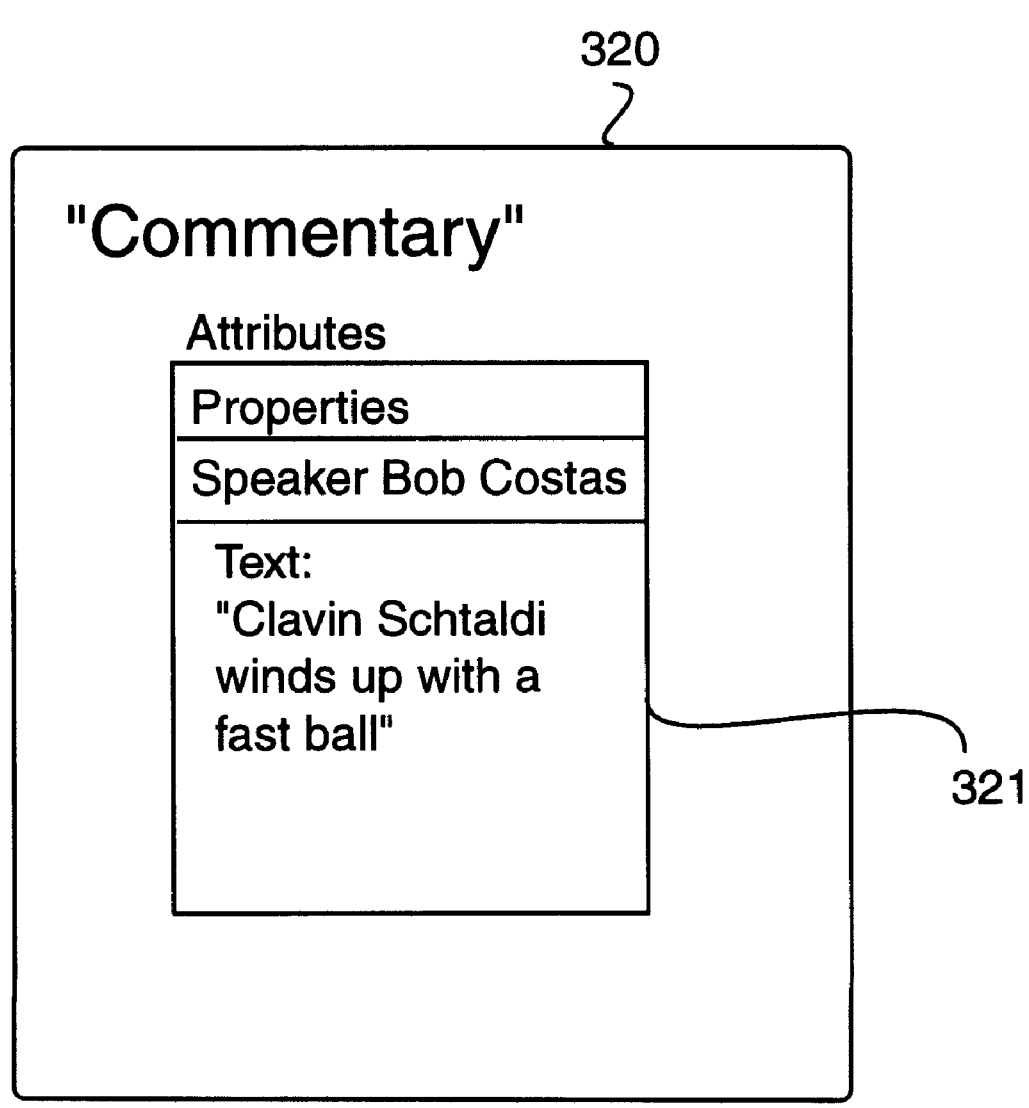

FIGS. 3a–3c illustrate multiple paths in terms of an example "baseball video" entity 300. In FIG. 3a, the content entity 300 includes attributes 301, relations 302, DAG-compositions 303, and a containment set 304. In FIG. 3b, a content entity 310 includes attributes 311, relations 312, DAG-Compositions 313, and a containment set 314.

As illustrated, a temporal DAG can represent equivalent interpretations of the same event. For instance as shown in FIGS. 3a and 3b, in the baseball video, a pitching and hitting sequence, or the inning that is being played may be recognizable through the observation of syntactic elements, such as motion, color and/or activity. However, as an alternate means of representation as shown in FIG. 3c, such a sequence or event can also be summarized by attributes 321 of the commentary of the announcer 320. So, from this example, is evident that multiple temporal interpretations of multimedia content are possible and that they may or may not occur simultaneously.

In the case of spatial DAGs, multiple paths can also represent equivalent interpretations, and in some sense can add a higher level of expressiveness. This added level of expressiveness is achieved by a grouping of individual objects into a composite object, then realizing that this composite object can be interpreted with a different semantic meaning. Usually, this new semantic interpretation is higher than before since more information is considered as a whole.

As an example, consider several objects: a gasoline pump, a gas attendant and a car. Individually, these objects have their own set of attributes and are distinct in their semantic meaning. Put together though, these individual objects can obviously be interpreted as a gas station. These multiple paths are efficiently represented by the DAG structure. On the syntactic side, various interpretations of the shape of an object for example may be deduced in a similar manner.

Generating Multimedia Content Description

Figure 4:
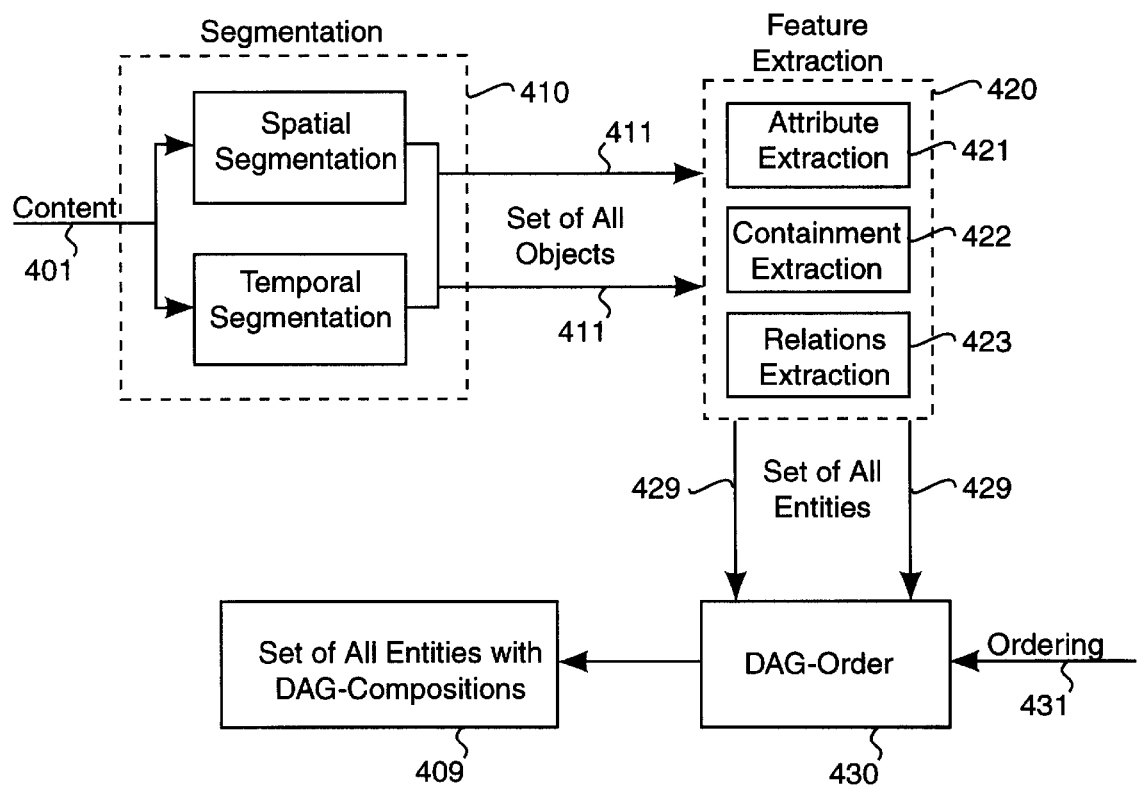
FIG. 4 is a flow diagram of a method for generating the description scheme according to the invention.

FIG. 4 illustrates a method 400 for generating a description scheme 409 from a multimedia content 401. The multimedia content can be a 2D image or a 3D video sequence. First, spatial and temporal segmentation 410 is applied to the multimedia content to extract objects 411. Next, feature extraction 420 is applied to the objects to obtain a set of all content entities 429. Feature extraction includes attribute extraction 421, containment extraction 422, and relations extractions 423. The DAG-Coder 430, according to an ordering 431, generates the DAG-Compositions for the entities 429 to form the multimedia content description 409 according to the invention.

Comparing Different Multimedia Content

Figure 5:
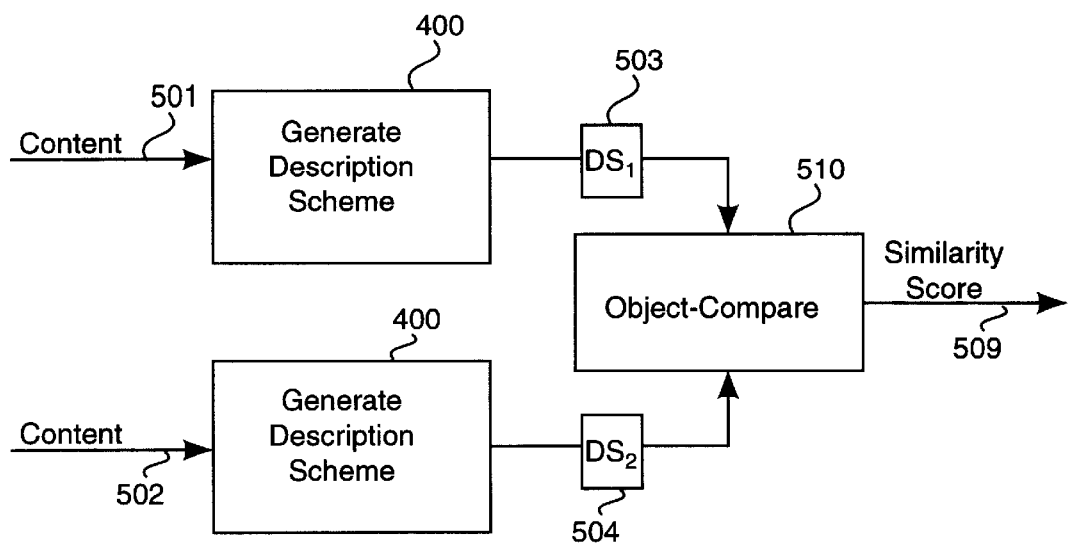
FIG. 5 is a flow diagram for a method for comparing the description schemes according to the invention.

FIG. 5 shows a method for comparing two different multimedia contents, content 1 501 and content 2 502. The method generates 400 two description schemes, $DS_1$ 503 and $DS_2$ 504. The descriptions are compared 510 to produce a similarity score 509. Given two types of objects, the object comparator returns a similarity score in terms of the probabilistic likelihood that the two objects are the same. The Object-Compare function 510 may recursively call other Object-Compare functions. The Object-Compare is very similar to the algorithm using for comparing Partially Ordered Trees (POT) as described in U.S. patent application Ser. No. 09/326,759 incorporated herein by reference. The key points are reviewed below.

We consider the matching algorithms used to compare Ordered Trees. Because trees are recursive structures, we can do optimal comparisons recursively and base the comparisons upon single node trees. Let us score our trees in the range of 0 to 1. Two single node trees are assigned a score of 1, while a single node tree and any tree with more than one node is assigned a score of 0.

For our inductive step, we note that each node corresponds to a sequence of edges and their respective children. To compare trees, we merely find the best correspondence between the sequences, while recursively comparing their corresponding children. A Largest Common Subsequence (LCS) matching can be used for this step. The Object-Compare methods allows efficient, robust and optimal comparison of objects at the same complexity of the Ordered Tree comparisons.

To handle the extra freedom in the expressiveness of DAGs, we use a DAG-Compare algorithm, see "Lin, et al., "Coding and Comparison of DAGs as a novel neural structure with application to on-line handwritten recognition," IEEE Trans Signal Processing, 1996, incorporated herein by reference. We find the two best-matching paths between two DAGs. Although more general, the DAG-Compare is of the same order complexity as the LCS search. Lastly, we should mention that the constraints on the containment hierarchy (as a DAG) allow us to use the POT-Compare algorithm, but the POT is merely a subset of our generic content entity.

Applications

The content description scheme described above is not only an expressive means of describing content entities, but also provides a robust similarity measure that is computationally efficient and can seamlessly integrate various descriptions, both semantic and syntactic. Within the description scheme according to our invention, content entities, their attributes and their relations form a basic hyperlink network such as available from the HTTP standard.

By constraining our graph structures to Directed Acyclic Graphs onto the hierarchy of our content entities and their descriptions, we can give an extra expressiveness over ordered trees while maintaining computational complexity for robust comparison between content entities that is equivalent to an ordered tree comparison.

Freedom in Expressiveness

There is no strict hierarchy of content entities: any object may strictly contain another object as long as the containment is not contradictory. Instead of a tree hierarchy, the containment relation over the content entities induces a directed acyclic graph. Acircularity is maintained by disallowing contradictory containment. The restriction on cycles enables an efficient recursive formulation of comparison.

Focusing on the DAG structure, we map the DAG structure of DAG-Composition as follows: edges represent content entities, and nodes correspond to breakpoints segmentation. We can structure the object as a configuration of contained content entities within DAGs according to a predefined topological order. The restrictions on the DAGs compared to a general graph structure is its topological ordering. This order may be temporal or spatial, but it must be 1D. By following the order and obeying connectivity, a subgraph of DAG structure leads to a new concept: an ordered path represents a particular interpretation of multimedia content, i.e. a representative view of the content entity as an ordered subset of its contained entities.

Because a DAG can contain multiple ordered paths, the DAG becomes a compact representation of the multiple interpretations of the data. The DAG data structure allows for the concept of parallel paths; thus, the DAG may integrate both semantic and syntactic elements through this parallel structure. The semantic and syntactic elements are not necessary equivalent, but, within the context of the DAG structure, they can be made interchangeable by placing them on these parallel constructions and its ordering.

These functionalities are a subset of a generic graph structure. However, as most graph matching problems are still open, these restrictions will allow us to compare these expressive structures. Although this ordering constrains the expressiveness of a DAG-composition, it does allow for element alignment in robust comparison of content entities.

Universal Multimedia Access

Figure 6:
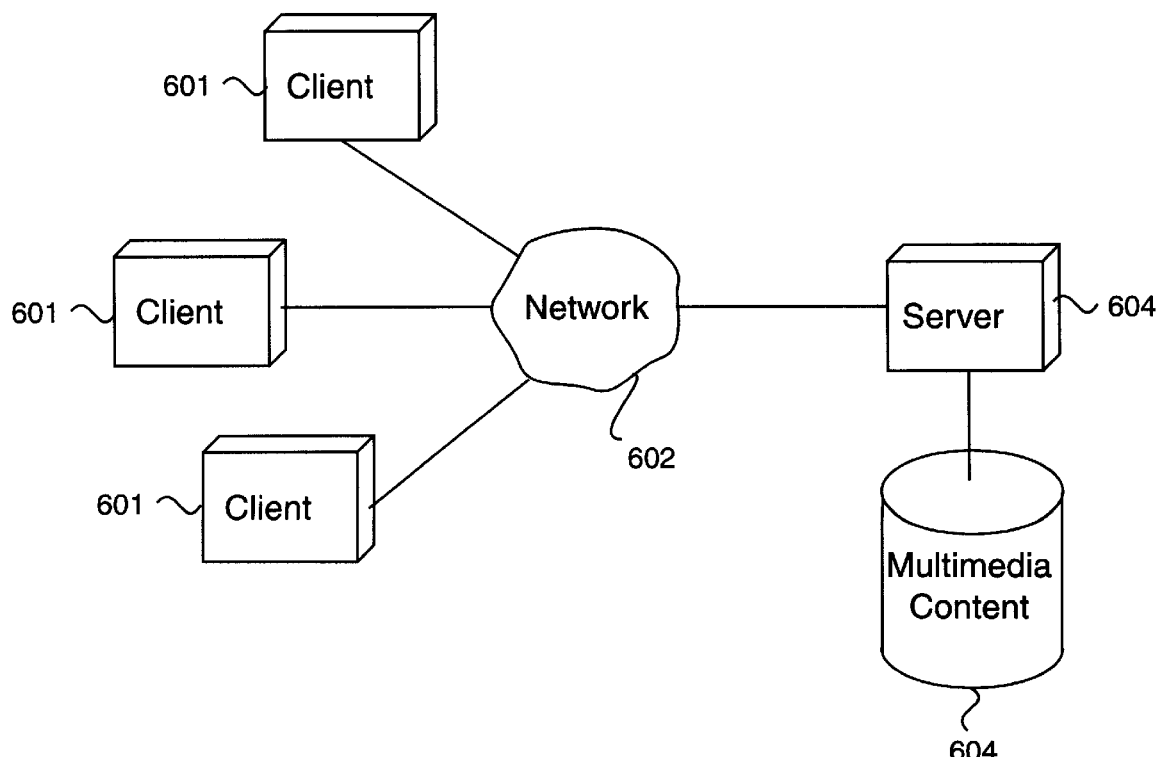
FIG. 6 is a block diagram of a client accessing multimedia on a server according to the invention.

Because our description scheme is capable of representing and comparing multiple interpretations of multimedia content, it fits very well with the concept of Universal Multimedia Access (UMA). The basic idea of UMA, as shown in FIG. 6, is to enable client devices 601 with limited communication, processing, storage and display capabilities to access, via a network 602, rich multimedia content 603 maintained by a server device 604.

Recently, several solutions have focussed on adapting the multimedia content to the client devices. UMA can be provided in two basic ways—the first by storing, managing, selecting, and delivering different versions of the media objects (images, video, audio, graphics and text) that comprise the multimedia presentations. The second way is by manipulating the media objects on-the-fly, such as by using methods for text-to-speech translation, image and video transcoding, media conversion and summarization. This allows the multimedia content delivery to adapt to the wide diversity of client device capabilities in communication, processing, storage, and display.

Our description scheme can support UMA through the first item mentioned above, that is, depending on the client-side capabilities, the server-side may choose to send a more elaborate interpretation of the multimedia content or simply send a brief summary of the multimedia content. In this way, our description scheme acts as a managing structure that helps decide which interpretation of the multimedia content is best suited for the client-side devices. As part of the attributes for a content entity, the requirements may include items such as the size of each image or video frame, the number of video frames in the multimedia content, and other fields that pertain to resource requirements.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a representation of multimedia content, comprising the steps of:

segmenting the multimedia content to extract video objects;

extracting and associating features of the video objects to produce content entities, the features include attributes and relations of the video objects, wherein the attributes are an unordered set of global properties of the video objects; and coding the content entities to produce directed acyclic graphs of the content entities, each directed acyclic graph representing a particular interpretation of the multimedia content, and wherein nodes of the directed acyclic graphs represent the content entities and edges represent breaks in the segmentation.

2. The method of claim 1 wherein the multimedia content is a two dimensional image.

3. The method of claim 1 wherein the multimedia content is a three dimensional video sequence.

4. The method of claim 1 wherein the segmenting is spatial.

5. The method of claim 1 wherein the segmenting is temporal.

6. The method of claim 1 wherein the segmenting is spatial and temporal.

7. The method of claim 1 wherein the properties are semantic and syntactic.

8. The method of claim 7 wherein the semantic properties include object type and event type, and the syntactic properties include color and motion.

9. The method of claim 1 wherein the breaks represent points in time in the segmentation where entities begin and end.

10. The method of claim 1 wherein the directed acyclic graphs represent a spatial ordering of the content entities.

11. The method of claim 1 wherein the directed acyclic graphs represent a temporal ordering of the content entities.

12. The method of claim 1 further comprising the step of generating a containment set for the content entities.

13. The method of claim 12 wherein the containment set includes pointers to other content entities that are spatially and temporally contained in a particular content entity.

14. The method of claim 12 wherein the containment set is unordered.

15. The method of claim 1 generating a first representation including a first directed acyclic graph for a first multimedia content and a second representation including a second acyclic graph for a second multimedia content, and further comprising the step of:

comparing the first and second directed acyclic graphs to determine a similarity score for the first and second multimedia contents.

16. The method of claim 15 wherein the comparing uses largest common subsequence matching.

17. The method of claim 15 wherein the comparing uses path matching.

18. The method of claim 1 wherein the multimedia content is maintained by a server computer, and accessed by a client computer connected to the server computer by a network.

* * * * *